US012353256B2

(12) United States Patent
Wang

(10) Patent No.: US 12,353,256 B2
(45) Date of Patent: Jul. 8, 2025

(54) DISPLAY DEVICE AND FOLDING DISPLAY MODULE THEREOF

(71) Applicant: WUHAN CHINA STAR OPTOELECTRONICS SEMICONDUCTOR DISPLAY TECHNOLOGY CO., LTD., Hubei (CN)

(72) Inventor: Wenqiang Wang, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 18/247,532

(22) PCT Filed: Mar. 16, 2023

(86) PCT No.: PCT/CN2023/081883
§ 371 (c)(1),
(2) Date: Mar. 31, 2023

(87) PCT Pub. No.: WO2024/045559
PCT Pub. Date: Mar. 7, 2024

(65) Prior Publication Data
US 2024/0361810 A1     Oct. 31, 2024

(30) Foreign Application Priority Data
Sep. 2, 2022  (CN) .......................... 202211073940.4

(51) Int. Cl.
*G06F 1/16*       (2006.01)

(52) U.S. Cl.
CPC .......... *G06F 1/1681* (2013.01); *G06F 1/1616* (2013.01); *G06F 1/1652* (2013.01); *G06F 1/1656* (2013.01)

(58) Field of Classification Search
CPC .... G06F 1/1681; G06F 1/1616; G06F 1/1652; G06F 1/1656; G06F 9/301; H05K 5/0217
See application file for complete search history.

(56) References Cited

U.S. PATENT DOCUMENTS

| 2014/0029171 A1* | 1/2014 | Lee ..................... H04M 1/0268 |
| | | 361/679.01 |
| 2019/0391618 A1* | 12/2019 | Hsu ....................... G06F 1/1616 |

(Continued)

FOREIGN PATENT DOCUMENTS

| CN | 103582340 A | 2/2014 |
| CN | 106788536 A | 5/2017 |

(Continued)

OTHER PUBLICATIONS

Chinese Office Action issued in corresponding Chinese Patent Application No. 202211073940.4 dated Jul. 11, 2023, pp. 1-16.

(Continued)

*Primary Examiner* — Abhishek M Rathod
(74) *Attorney, Agent, or Firm* — PV IP PC; Wei Te Chung

(57) ABSTRACT

The disclosure provides a display device and a folding display module thereof. The display device includes: a first frame and a second frame butted with the first frame; a hinge transmission mechanism; a first support plate slidably connected to the second frame and being capable to reciprocate relative to the second frame along a second direction; a flexible display screen, wherein an end of the flexible display screen is fixedly attached on the first support plate; and a first preload mechanism disposed on the second frame and being configured to exert a first preload force on the first (Continued)

support plate, wherein a direction of the first preload force is same as the second direction.

17 Claims, 12 Drawing Sheets

(56) References Cited

U.S. PATENT DOCUMENTS

| | | | | |
|---|---|---|---|---|
| 2022/0322547 | A1* | 10/2022 | Wang | G06F 1/1652 |
| 2023/0231942 | A1* | 7/2023 | Wang | H04M 1/0268 |
| | | | | 455/566 |
| 2024/0028086 | A1* | 1/2024 | Feng | G06F 1/1652 |

FOREIGN PATENT DOCUMENTS

| | | | |
|---|---|---|---|
| CN | 107102692 | A | 8/2017 |
| CN | 210955912 | U | 7/2020 |
| CN | 213655447 | U | 7/2021 |
| CN | 113674629 | A | 11/2021 |
| CN | 114157742 | A | 3/2022 |
| CN | 114244935 | A | 3/2022 |
| CN | 114810805 | A | 7/2022 |
| CN | 115482733 | A | 12/2022 |

OTHER PUBLICATIONS

International Search Report in International application No. PCT/CN2023/081883, mailed on Jul. 17, 2023.
Written Opinion of the International Search Authority in International application No. PCT/CN2023/081883, mailed on Jul. 17, 2023.

* cited by examiner

DISPLAY DEVICE AND FOLDING DISPLAY MODULE THEREOF

TECHNICAL FIELD

The disclosure relates to the technical field of display, in particular to a display device and a folding display module thereof.

BACKGROUND

Foldable electronic devices combine portability of ordinary electronic devices and ultimate experience of large-sized screen displays after flattening. Therefore, the foldable electronic devices have gradually become an important trend in development of mobile terminals, and have become an important field of competition for major terminal manufacturers.

However, in the prior art, after repeated folding of the folding display devices, due to fatigue plastic deformation of film materials and adhesive materials at bending areas of display screens, existing folding display devices are prone to crease at the bending areas.

SUMMARY

The disclosure provides a display device and a folding display module thereof to improve a technical problem that display screens are prone to crease after repeated folding.

The disclosure provides a display device, and the display device includes:
 a first frame;
 a second frame butted with the first frame;
 a hinge transmission mechanism disposed at a butt joint of the first frame and the second frame, and rotationally connected to the first frame and the second frame, respectively, wherein a rotation shaft of the first frame and the second frame when rotating relative to the hinge transmission mechanism extends along a first direction;
 a first support plate slidably connected to the second frame, wherein the first support plate is capable to reciprocate relative to the second frame along a second direction, the second direction points from an end of the first support plate close to the hinge transmission mechanism to an end of the first support plate away from the hinge transmission mechanism, and the second direction is perpendicular to the first direction;
 a flexible display screen, wherein an end of the flexible display screen is fixed on the first frame, and another end of the flexible display screen is fixedly attached on a side of the first support plate away from the second frame; and
 a first preload mechanism disposed on the second frame, wherein the first preload mechanism is configured to exert a first preload force on the first support plate, and a direction of the first preload force is same as the second direction.

The disclosure further provides a display device, and the display device includes:
 a first frame;
 a second frame butted with the first frame;
 a hinge transmission mechanism disposed at a butt joint of the first frame and the second frame, and rotationally connected to the first frame and the second frame, respectively, wherein a rotation shaft of the first frame and the second frame when rotating relative to the hinge transmission mechanism extends along a first direction;
 a first support plate slidably connected to the second frame, wherein the first support plate is capable to reciprocate relative to the second frame along a second direction, the second direction points from an end of the first support plate close to the hinge transmission mechanism to an end of the first support plate away from the hinge transmission mechanism, and the second direction is perpendicular to the first direction;
 a second support plate slidably connected to the first frame, wherein the second support plate is capable to reciprocate relative to the first frame in the second direction;
 a flexible display screen, wherein an end of the flexible display screen is fixed on the second support plate away from the second frame, and another end of the flexible display screen is fixedly attached on a side of the first support plate away from the second frame;
 a first preload mechanism disposed on the second frame, wherein the first preload mechanism is configured to exert a first preload force on the first support plate, and a direction of the first preload force is same as the second direction; and
 a second preload mechanism disposed on the first frame, wherein the second preload mechanism is configured to exert a second preload force on the second support plate, and a direction of the second preload force is opposite to the second direction.

The disclosure further provides a folding display module configured to combine with a first frame and a second frame to constitute a display device, and the folding display module includes:
 a hinge transmission mechanism disposed at a butt joint of the first frame and the second frame, and rotationally connected to the first frame and the second frame, respectively, wherein a rotation shaft of the first frame and the second frame when rotating relative to the hinge transmission mechanism extends along a first direction;
 a first support plate slidably connected to the second frame, wherein the first support plate is capable to reciprocate relative to the second frame along a second direction, the second direction points from an end of the first support plate close to the hinge transmission mechanism to an end of the first support plate away from the hinge transmission mechanism, and the second direction is perpendicular to the first direction;
 a flexible display screen, wherein an end of the flexible display screen is fixed on the first frame, and another end of the flexible display screen is fixedly attached on a side of the first support plate away from the second frame; and
 a first preload mechanism disposed on the second frame, wherein the first preload mechanism is configured to exert a first preload force on the first support plate, and a direction of the first preload force is same as the second direction.

In the display device and the folding display module applied to the display device provided by the disclosure, a cooperation of the first frame, the second frame, and the hinge transmission mechanism can realize switching of the display device between the folded state and the flattened state. At s same time, a structural design of the first support plate and the first preload mechanism can be utilized to exert a preload force on the flexible display screen, so as to ensure that the flexible display screen always maintains a certain pretension force, so that a folding position of the flexible display screen is not easy to crease when the display device switches between the folded state and the flattened state.

BRIEF DESCRIPTION OF DRAWINGS

In order to explain technical solutions in the embodiments of the disclosure more clearly, the following will briefly introduce the drawings needed to be used in description of the embodiments. Obviously, the drawings in the following description are only some embodiments of the disclosure. For those skilled in the art, other drawings can be obtained from these drawings without paying creative effort.

Figure 1:
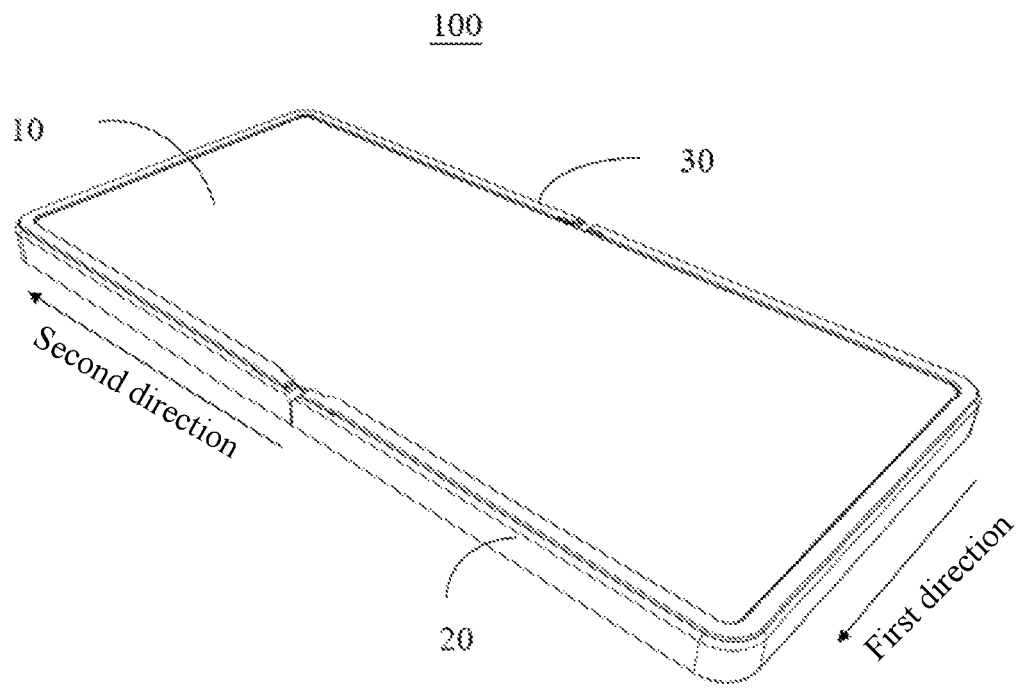
FIG. 1 is a schematic three-dimensional structural diagram of a display device provided by an embodiment of the disclosure in a flattened state.

REFERENCE NUMERALS display device 100;
flexible display screen 10, first frame 20, second frame 30, hinge transmission mechanism 40, first support plate 50, first preload mechanism 60, front frame 70, slide block 80, and screw 90;
second sliding slot 301, slide slot 302, clamping slot 303, accommodating slot 304, lug 501, guiding slot 502, transmission assembly 401, and hinge assembly 402;
connecting unit 11, gear transmission unit 12, base 13, cover plate 14, floating plate 15, sliding element 16, spring 61, and push pin 62;
first connecting element 111, second connecting element 112, mounting base 121, transmission gear 122, linkage gear 123, body part 151, first hinge part 152, sliding part 161, second hinge part 162, and guiding plate 163; and
first part 1211, first mounting hole 12110, second part 1212, second mounting hole 12120, first floating plate 1501, second floating plate 1502, first sliding element 1601, and second sliding element 1602.

DETAILED DESCRIPTION OF EMBODIMENT

In combination with drawings in the embodiments of the disclosure, technical solutions in the embodiments of the disclosure will be described clearly and completely. Obviously, the described embodiments are only part of the embodiments of the disclosure, not all of them. Based on the embodiments of the disclosure, all other embodiments obtained by those skilled in the art without creative effort belong to a scope of the disclosure. In addition, it should be understood that specific embodiments described herein are only used to explain and interpret the disclosure and are not used to limit the disclosure. In the disclosure, location terms used, such as "up" and "down", generally refer to up and down in actual using or working state of devices, in particular drawing directions in the drawings, unless otherwise described; terms "inside" and "outside" refer to outlines of the devices.

Figure 2:
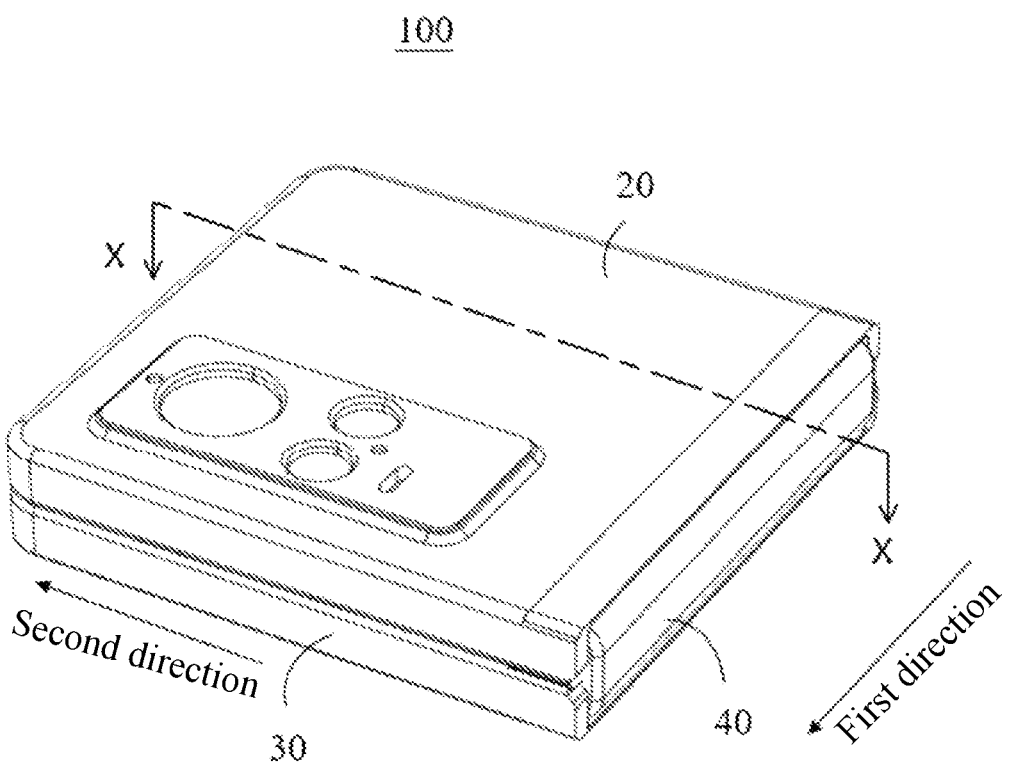
FIG. 2 is a schematic three-dimensional structural diagram of the display device shown in FIG. 1 in a folded state.
Figure 3:
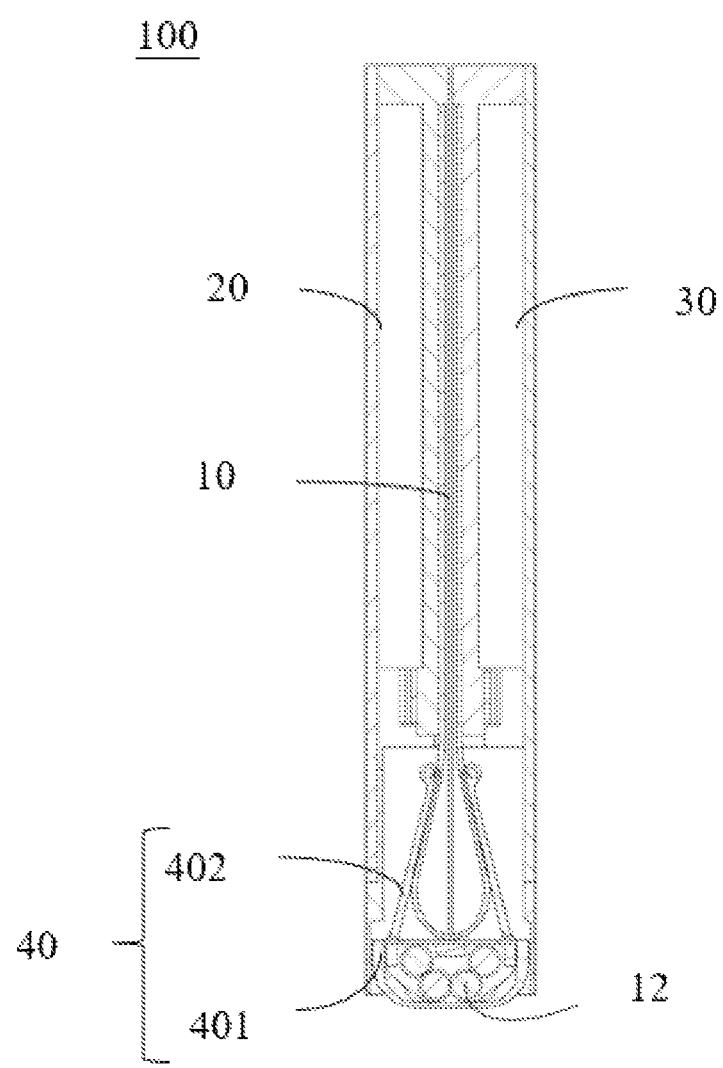
FIG. 3 is a schematic sectional structural diagram of the display device shown in FIG. 2 taken along a line of X-X.

Referring to FIG. 1 to FIG. 4, the disclosure provides a display device 100, and the display device 100 is operable in a flattened state (as shown in FIG. 1) and a folded state (as shown in FIG. 2). The display device 100 includes at least a flexible display screen 10, a first frame 20, a second frame 30, a hinge transmission mechanism 40, a first support plate 50, and a first preload mechanism 60. The first frame 20 is butted with the second frame 30. The flexible display screen 10 is disposed on the first frame 20 and the second frame 30. The hinge transmission mechanism 40 is disposed at a butt joint of the first frame 20 and the second frame 30, and is rotatably connected to the first frame 20 and the second frame 30, respectively. The first support plate 50 is slidably connected to the second frame 30. An end of the flexible display screen 10 is fixed on the first frame 20, and another end of the flexible display screen 10 is fixedly attached on a side of the first support plate 50 away from the second frame 30. The first preload mechanism 60 is disposed on the second frame 30 and configured to exert a first preload force on the first support plate 50. The first support plate 50 is configured to flatten the flexible display screen 10 under an action of the first preload force.

Specifically, the first frame 20 and the second frame 30 can rotate relative to the hinge transmission mechanism 40 to switch the display device 100 between the flattened state and the folded state. For convenience of explanation, it is defined that a rotation shaft of the first frame 20 and the second frame 30 when rotating relative to the hinge transmission mechanism 40 extends along a first direction. A direction in which the first support plate 50 can reciprocate relative to the second frame 30 is a second direction, and the second direction points from an end of the first support plate 50 close to the hinge transmission mechanism 40 to an end of the first support plate 50 away from the hinge transmission mechanism 40. The second direction is perpendicular to the first direction. A direction of the first preload force is same as the second direction.

By using a cooperation of the first frame 20, the second frame 30, and the hinge transmission mechanism 40, the disclosure can realize switching of the display device 100 between the folded state and the flattened state. At a same time, a structural design of the first support plate 50 and the first preload mechanism 60 can be utilized to exert the first preload on the flexible display screen 10, so as to ensure that the flexible display screen 10 always maintains a certain pretension force, so that a folding position of the flexible display screen 10 is not easy to crease when the display device 100 switches between the folded state and the flattened state.

Figure 5:
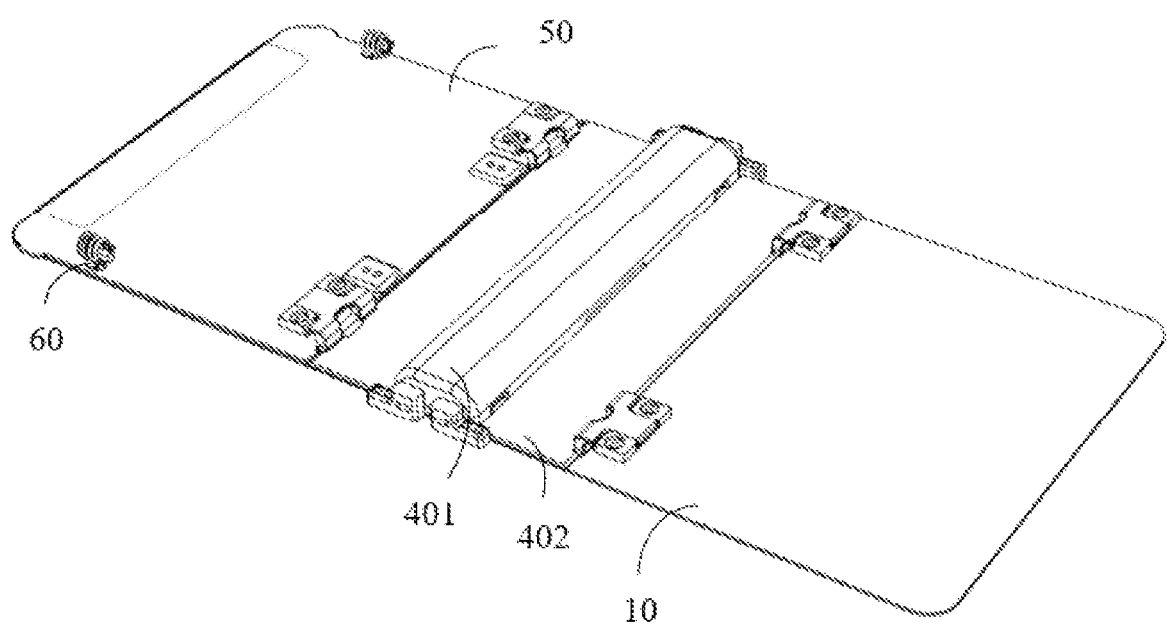
FIG. 5 is a schematic three-dimensional structural diagram of a folding display module of the display device shown in FIG. 1.
Figure 6:
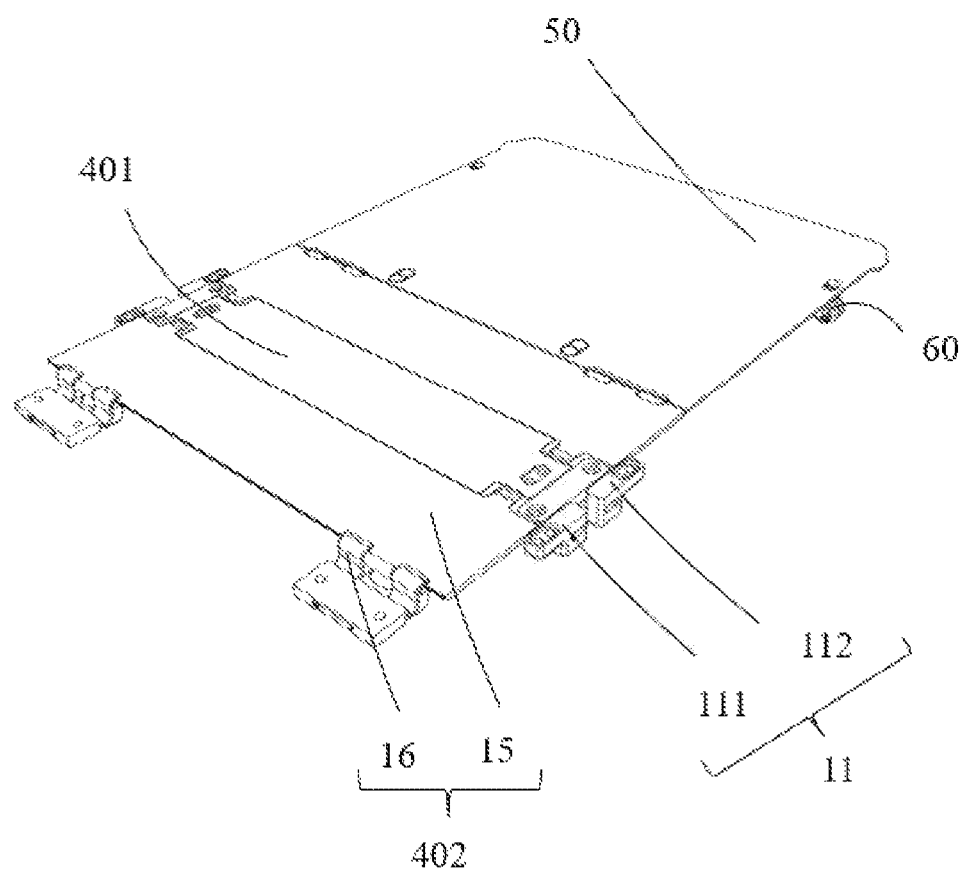
FIG. 6 is a schematic three-dimensional structural of the folding display module shown in FIG. 5 at another angle after hiding a flexible display screen.
Figure 7:
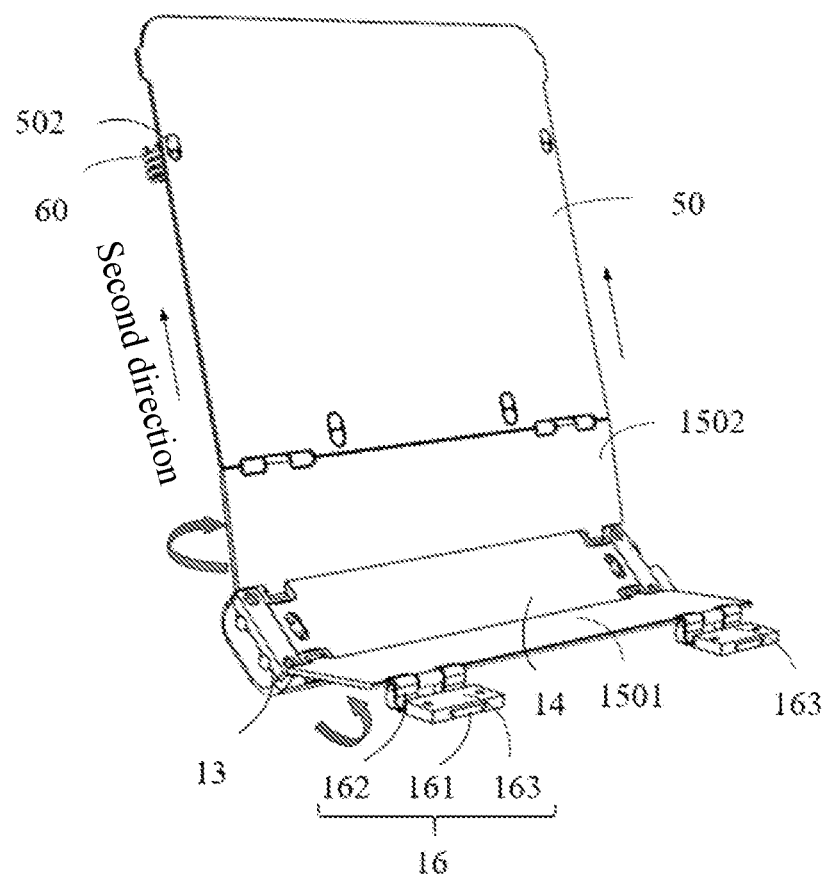
FIG. 7 is a schematic assembly diagram of a structure shown in FIG. 6 and a first frame and a second frame.
Figure 8:
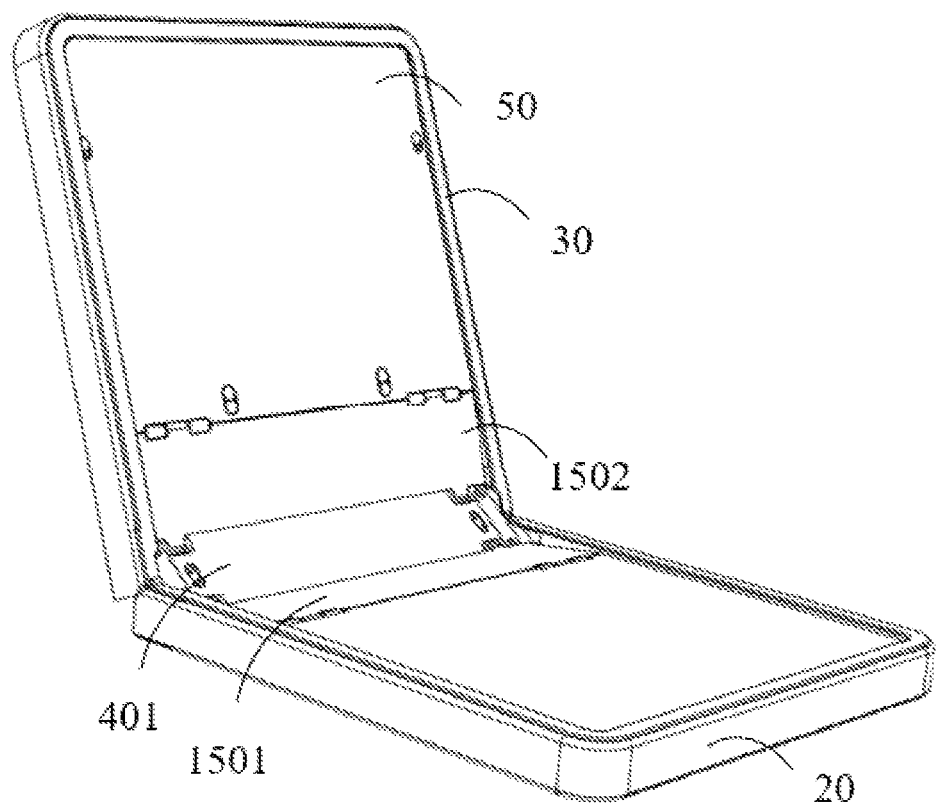
FIG. 8 is a schematic three-dimensional structural diagram of the structure shown in FIG. 6 in a semi-folded state.
Figure 9:
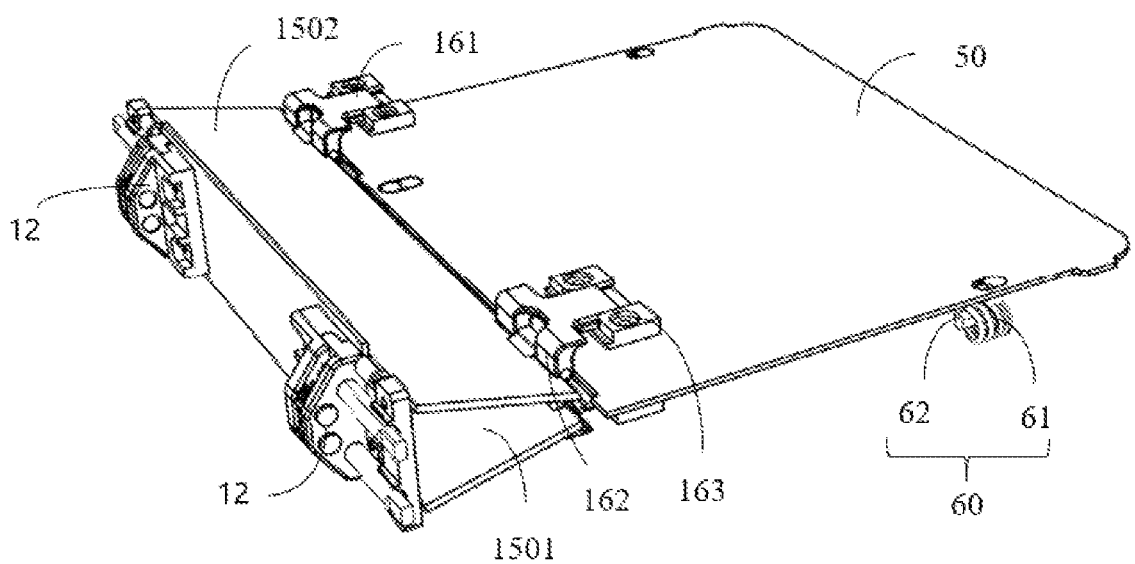
FIG. 9 is a schematic three-dimensional structural diagram of the structure shown in FIG. 6 in a folded state.
Figure 10:
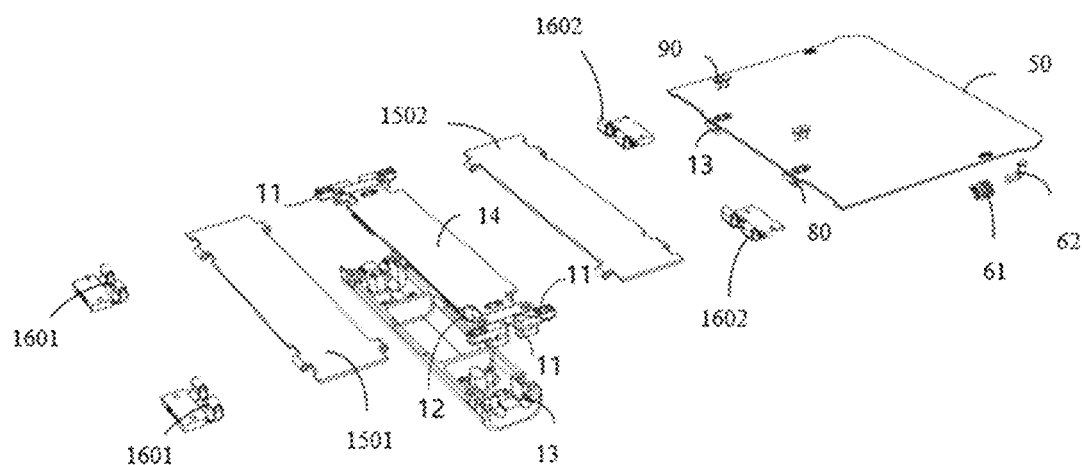
FIG. 10 is a schematic exploded diagram of the structure shown in FIG. 6.
Figure 11:
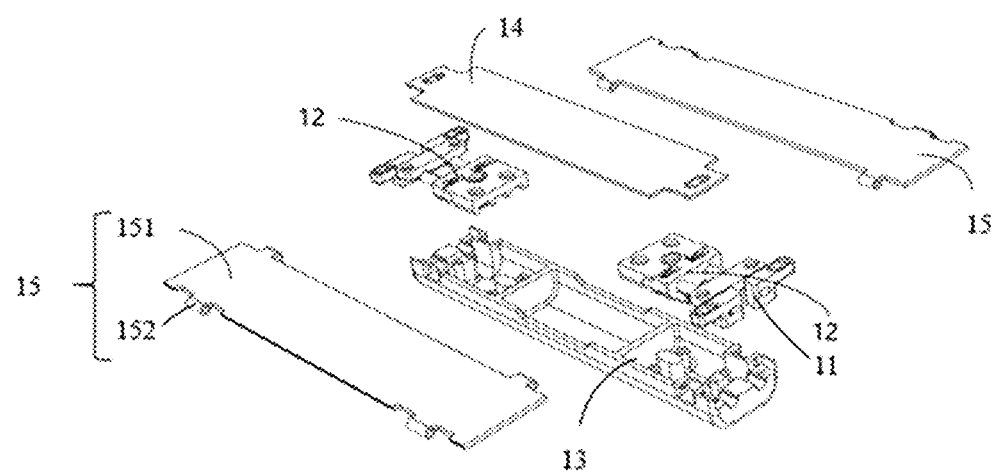
FIG. 11 is a schematic exploded diagram of part structures of a hinge transmission mechanism shown in FIG. 10 at another angle.
Figure 12:
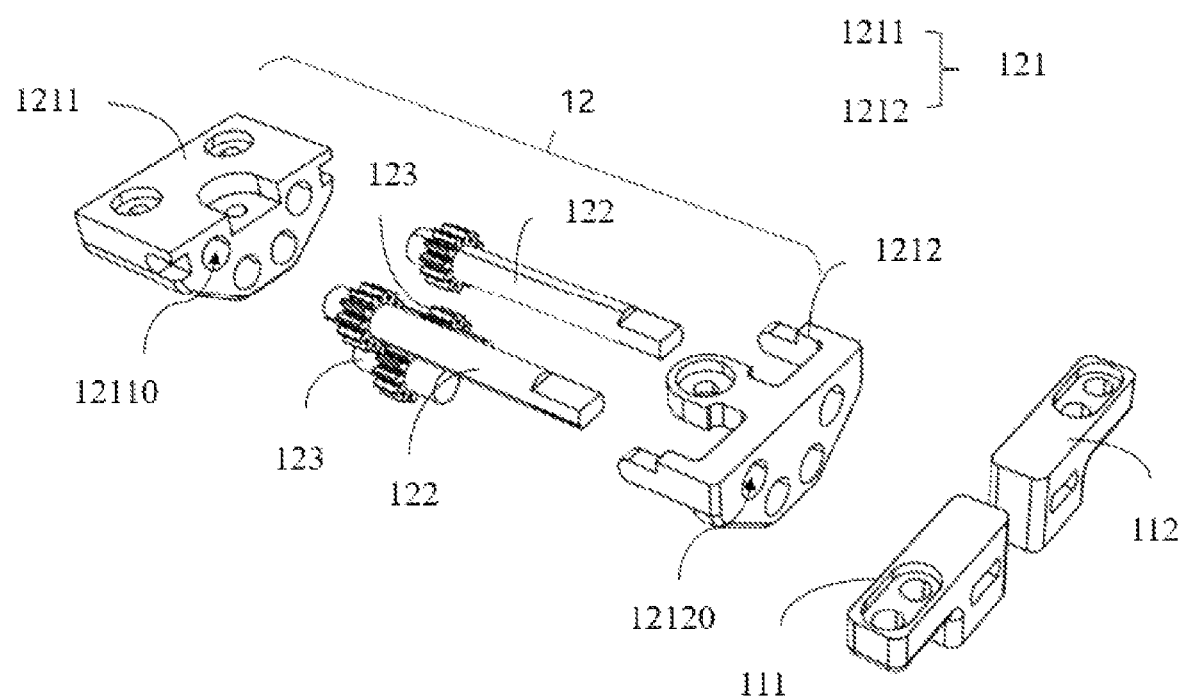
FIG. 12 is a schematic exploded diagram of a gear transmission unit of the hinge transmission mechanism shown in FIG. 11.
Figure 13:
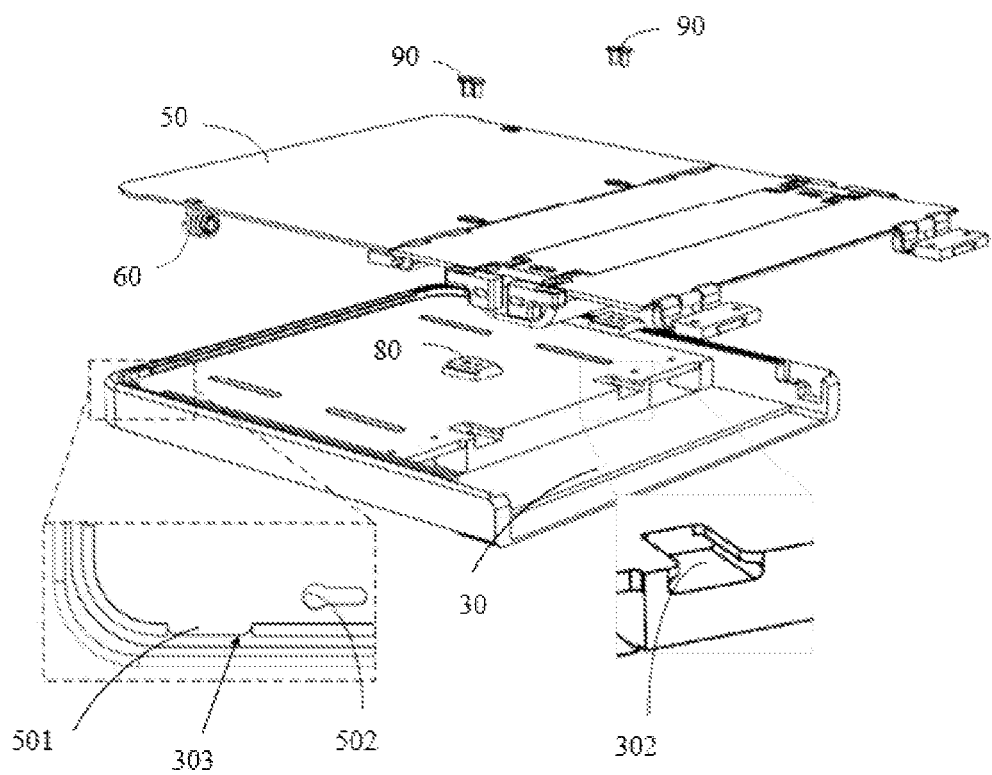
FIG. 13 is a schematic exploded diagram of the second frame, a first preload mechanism, and a first support plate shown in FIG. 4 at another angle.
Figure 14:
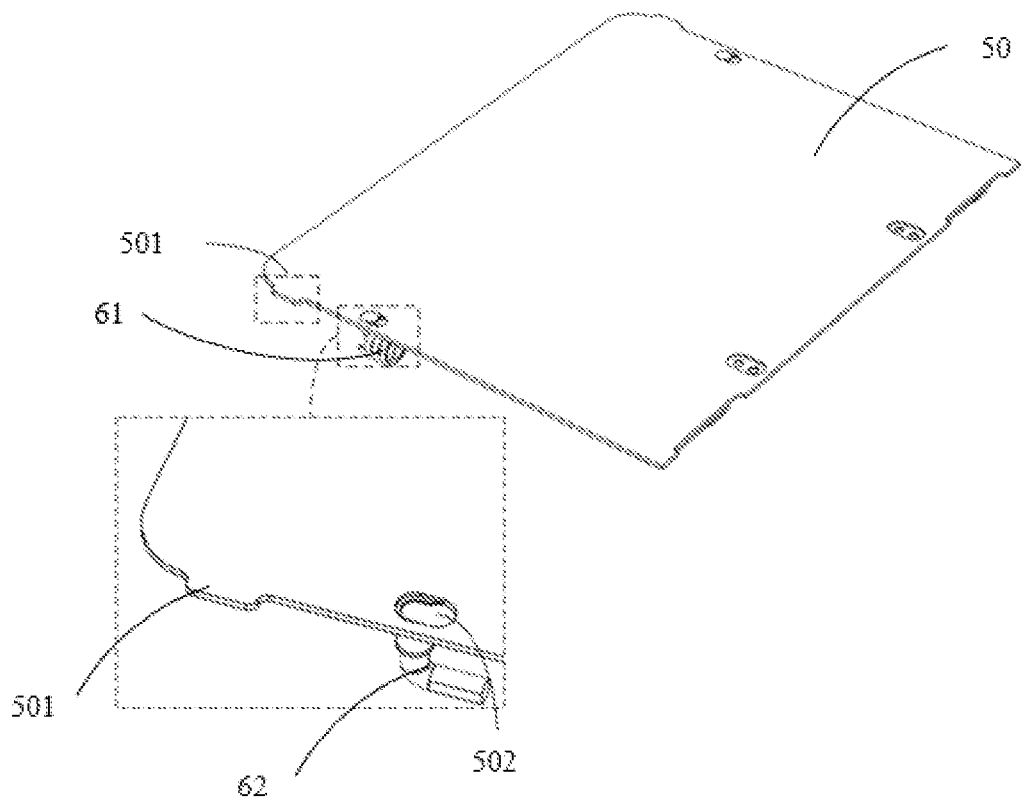
FIG. 14 is a schematic assembly diagram of the first preload mechanism and the first support plate shown in FIG. 13.
Figure 15:
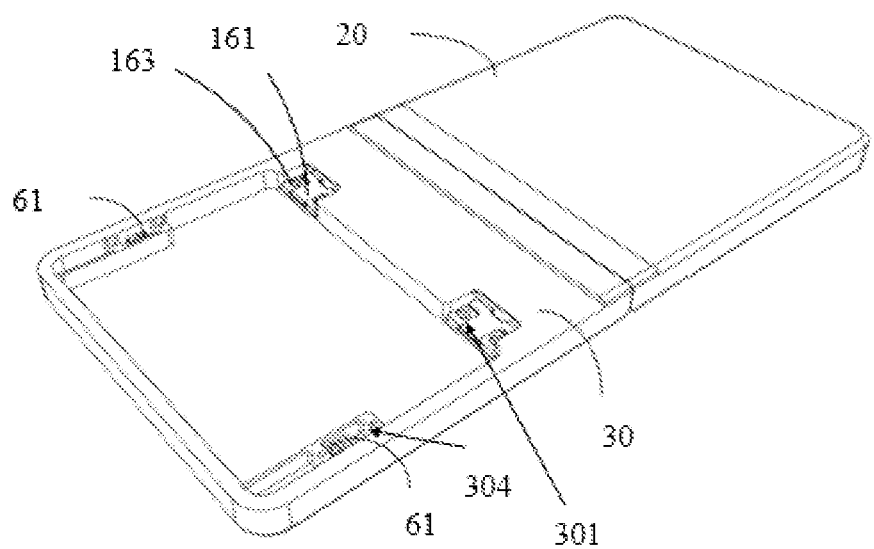
FIG. 15 is a schematic assembly diagram of the first preload mechanism and a second frame shown in FIG. 13.
Figure 16:
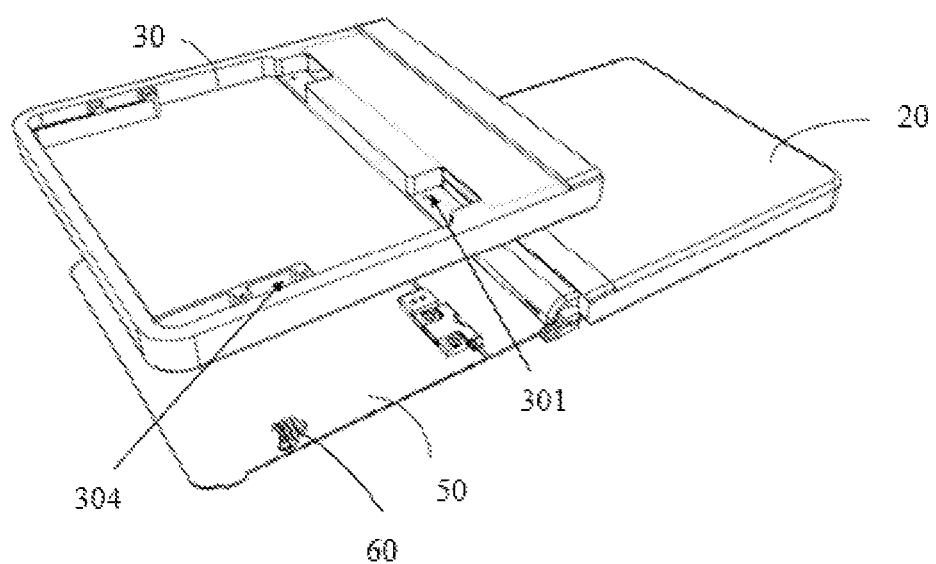
FIG. 16 is schematic exploded diagram of a structure shown in FIG. 15.

Preferably, during a process of structural assembly, the hinge transmission mechanism 40, the first support plate 50, the first preload mechanism 60, and the flexible display screen 10 are first assembled to form a folded display module, as shown in FIG. 5, then, the folded display module is assembled into the first frame 20 and the second frame 30. The above-mentioned assembly method can reduce a risk of screen failure caused by mismatch of bending track caused by excessive assembly errors between the flexible display screen 10 and the hinge transmission mechanism 40, and at a same time, assembly convenience and an assembly yield of the entire display device can be improved. It can be understood that an assembly sequence of the display device 100 may also be selected according to actual situations when the display device 100 is assembled in other embodiments.

The following describes structures of each part of the display device 100, interconnection of the structures of each part, and actuation relationships between the structures of each part in detail.

The flexible display screen 10 is a flexible folding screen body, which can, but is not limited to, various flexible display bodies with corresponding functions such as conventional flexible display screens, flexible touch screens, etc. The first frame 20 and the second frame 30 are both middle frame structures of the display device 100.

In some embodiments, the flexible display screen 10 can be attached to the first support plate 50 and the second frame 30 through an easy-to-pull adhesive or a mesh adhesive.

In some embodiments, when the display device 100 is in the flattened state, the first frame 20 may be abutted against the second frame 30, and the hinge transmission mechanism 40 may be accommodated in the first frame 20 and the second frame 30. When the display device 100 is operable in in the folded state, the first frame 20 and the second frame 30 may be separated from each other, and the hinge transmission mechanism 40 may be exposed at least in part. It can be understood that in other embodiments, when the display device 100 is in the flattened state, the first frame 20 and the second frame 30 may also be abutted against two sides of the hinge transmission mechanism 40, respectively. When the display device 100 is operable in the folded state, a part of the hinge transmission mechanism 40 used to connect the first frame 20 with the second frame 30 is exposed. Preferably, in the folded state, the first frame 20 and the second frame 30 shut and are close to each other in a parallel state, and there is basically no gap between the first frame 20 and the second frame 30 after shutting, so as to prevent entry of external dust, foreign matters, particles, etc., thus protecting the screen body.

In some embodiments, in addition to the above-mentioned structures, other structures may be installed on a middle frame. For example, in the embodiment, the display device 100 also includes a front camera (not shown in the figures), and the front camera is installed on the first frame 20.

It can be understood that in other embodiments, if there is no front camera or there are other installation methods for installing the front camera, the display device 100 may also include a second support plate and a second preload mechanism. The second support plate is slidably installed on the first frame 20. Two opposite ends of the flexible display screen 10 are fixed on the first support plate 50 and the second support plate, respectively. The second preload mechanism is disposed on the first frame 20 and configured to exert a second preload force on the second support plate, and a direction of the second preload force is opposite to the second direction. A structure of the second support plate and a structure of the first support plate may be same. A structure of the second preload mechanism and a structure of the first preload mechanism may be same.

Figure 4:
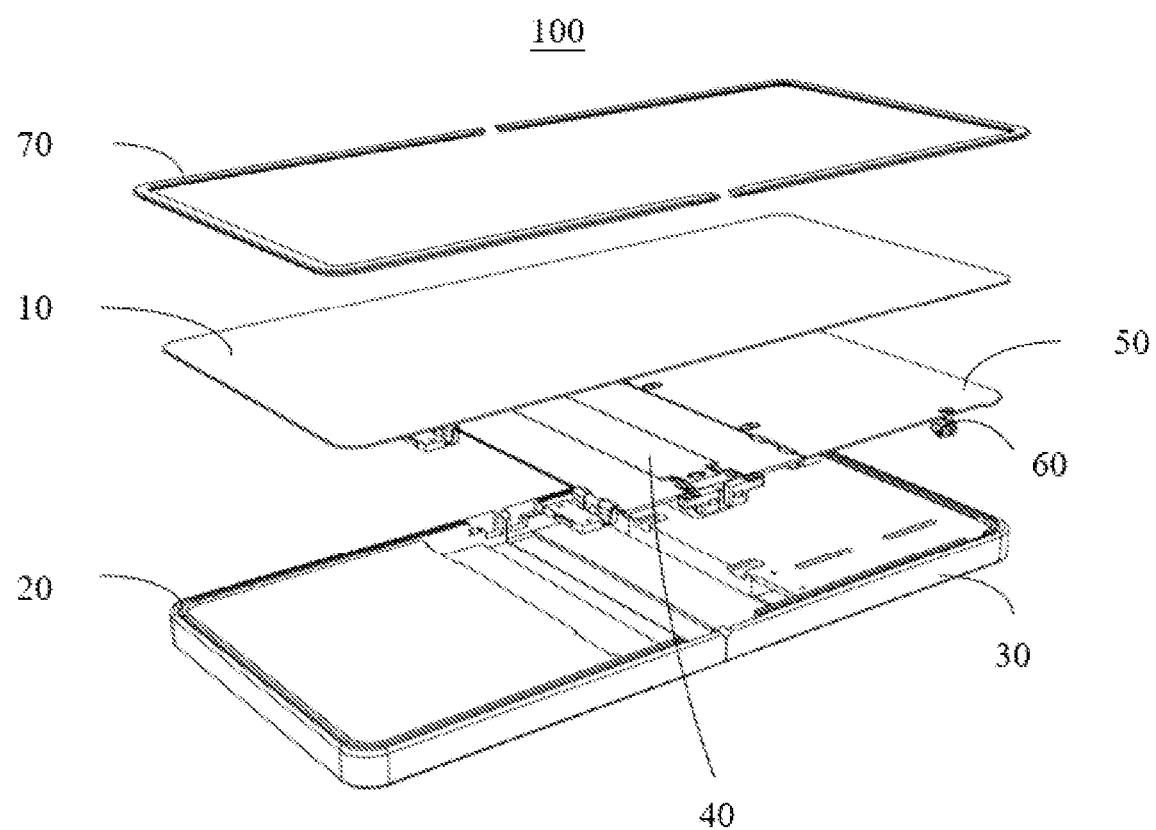
FIG. 4 is a schematic exploded diagram of the display device shown in FIG. 1.

In some embodiments, the display device 100 also includes two front frames 70, as shown in FIG. 4. Two front frames 70 are respectively fixed on the first frame 20 and the second frame 30, and are disposed on a side of the flexible display screen 10 away from the first frame 20 and the second frame 30, so as to tightly press periphery of the flexible display screen 10 onto the first frame 20 and the second frame 30, and to protect peripheral parts of the flexible display screen 10 to prevent external dust, foreign matters, sand, etc. from damaging the screen body.

Referring to FIG. 6 to FIG. 12. In the embodiment, the hinge transmission mechanism 40 includes a transmission assembly 401 and a hinge assembly 402. The transmission assembly 401 is disposed at the butt joint of the first frame 20 and the second frame 30, and is rotatably connected to the first frame 20 and the second frame 30. The hinge assembly 402 is hinged with the transmission assembly 401 and slidably disposed in the first frame 20 and the second frame 30. It can be understood that in some embodiments, the hinge transmission mechanism 40 may also only include the transmission assembly 401, that is, in some embodiments, only the transmission assembly 401 needs to be designed in the hinge transmission mechanism 40 to realize switching of the display device 100 between the folded state and the flattened state.

Preferably, the transmission assembly 401 uses a synchronous transmission assembly to realize joint rotation of the first frame 20 and the second frame 30. It can be understood that the transmission assembly 401 may also use other transmission structures according to actual situations and requirements in other embodiments, as long as the switching of the display device 100 between the folded state and the flattened state can be realized.

Specifically, in the embodiment, the transmission assembly 401 uses the synchronous transmission assembly, the synchronous transmission assembly includes at least a base 13, two gear transmission units 12, and two connecting units 11. The base 13 is disposed at the butt joint of the first frame 20 and the second frame 30. The two gear transmission units 12 are accommodated in the base 13 and respectively disposed at positions close to two ends of the base 13. The two connecting units 11 are respectively disposed at two opposite ends of the base 13, so as to rotatably connect the transmission assembly 401 with the first frame 20 and the second frame 30.

Specifically, in the embodiment, each gear transmission unit 12 includes a mounting base 121, two transmission gears 122, and two linkage gears 123. The mounting base 121 is fixed in the base 13. Rotation shafts of the two transmission gears 122 and rotation shafts of the two linkage gears 123 are rotatably disposed in the mounting base 121. The two linkage gears 123 are meshed with each other and configured to rotate in opposite directions. Each linkage gear 123 is meshed with a corresponding transmission gear 122, and each linkage gear 123 and the corresponding transmission gear 122 are configured to rotate in opposite directions.

Specifically, in the embodiment, the mounting base 121 includes a first part 1211 and a second part 1212. The first part 1211 and the second part 1212 are detachably fixed in the base 13. The first part 1211 is provided with four first mounting holes 12110, and the second part 1212 is provided with four second mounting holes 12120 corresponding to the four first mounting holes 12110. Two ends of the rotation shafts of the two transmission gears 122 and two ends of the rotation shafts of the two linkage gears 123 are correspondingly installed in the four first mounting hole 12110 and the four second mounting hole 12120, respectively, so as to accommodate gear parts of the two transmission gears 122 and gear parts of the two linkage gears 123 between the first part 121 and the second part 122.

Specifically, each connecting unit 11 includes a first connecting element 111 and a second connecting element 112. The first connecting element 111 and the second connecting element 112 are connected to the rotation shafts of the two transmission gears 122, respectively. The first connecting element 111 is fixedly connected to the first frame 20, and the second connecting element 112 is fixedly connected to the second frame 30.

When the folded state and the flattened state of the display device 100 needs to be switched, the first frame 20, the first connecting element 111, and the transmission gear 122 corresponding to the first connecting element 111 move synchronously, and the second frame 30, the second connecting element 112, and the transmission gear 122 corresponding to the first connecting element 111 move synchronously. At a same time, since the two linkage gears 123 are meshed with each other and configured to rotate in opposite directions, when the first frame 20 and/or the second frame 30 rotate relative to the base 13 under an action of an external force, transmission on two sides realizes linkage under an action of the two linkage gears 123, thus effectively improving stability of rotation of the display device 100 when the states are switched.

In some embodiments, the transmission assembly 401 also includes a cover plate 14, the cover plate 14 is fixed on a side of the base 13 towards the flexible display screen 10, and the cover plate 14 covers the two gear transmission units 12, so as to shut a cavity of the base 13 configured to accommodate the gear transmission unit 12, and while protecting the gear transmission unit 12, the cover plate 14 can effectively prevent dust and other debris from entering the base 13. In addition, a surface of the cover plate 14 away from the base 13 is a plane, the plane is configured to support a middle part of the flexible display screen 10 (that is, a bending part) in the flattened state, thereby avoiding collapse of the flexible display screen 10.

In the embodiment, the hinge assembly 402 includes two floating plates 15 and two groups of sliding elements 16. The two floating plates 15 are hinged with two opposite sides of the transmission assembly 401, respectively. The two groups of sliding elements 16 are respectively hinged with corresponding floating plate 15, and are slidably disposed on the first frame 20 and the second frame 30, respectively. It should be noted that "hinged" herein means that two hinged parts can relatively rotate at a certain angle.

Specifically, in the embodiment, the two floating plates 15 are hinged with two opposite sides of the base 13, respectively. Each floating plate 15 includes a body part 151 and a first hinge part 152 disposed on two sides of the body part 151. The body part 151 is a flat plate, and the first hinge part 152 is hinged with the base 13 and the sliding element 16 through a pin (not shown in the figures). In state switching of the display device 100, each floating plate 15 can respectively rotate around hinge points hinged with the base 13 and hinge points hinged with the sliding element 16 to achieve actions of flattening and avoidance. Specifically, in the flattened state, the body part 151 of each floating plate 15 is flush with the cover plate 14 and abutted against each other, so as to jointly support the flexible display screen 10, improve flatness and supportability of the flexible display screen 10, and prevent the flexible display screen 10 from collapsing or concaving when users touch or clicks collapsing or concaving area. Preferably, in the embodiment, in the above-mentioned situations, each floating plate 15 is parallel to the first frame 20 and the second frame 30. In the folded state, the two floating plates 15 and the cover plate 14 define a triangular space to accommodate bending parts of the flexible display screen 10.

Specifically, the two floating plates 15 include or are respectively a first floating plate 1501 and a second floating plate 1502.

Specifically, a number of sliding elements 16 in each group of the sliding element 16 is at least one. Each sliding element 16 includes a sliding part 161 and a second hinge part 162 connected to the sliding part 161. The second hinge part 162 is hinged with corresponding first hinge part 152 by a pin, and the sliding part 161 is slidably disposed on the corresponding first frame 20 or the corresponding second frame 30.

Specifically, the first frame 20 and the second frame 30 are both provided with a same number of sliding slots as the sliding element 16, and the sliding part 161 is slidably disposed and accommodated in a corresponding sliding slot. In the embodiment, each sliding slot is fixed with a guiding plate 163, the guiding plate 163 is provided with a slideway extending along the second direction, and the slide part 161 is slidably disposed on the guiding plate 163 and can reciprocate relative to the guiding plate 163 along the slideway. It can be understood that the guiding plate 163 may also be omitted and the sliding part 161 may also be disposed in the sliding slot in other embodiments, as long as it can meet a sliding connection between the sliding part 161 and the first frame 20 or the second frame 30.

Understandably, for convenience of explanation, it can be defined that the sliding element 16 connected to the first frame 20 is a first sliding element 1601, and the sliding element 16 connected to the second frame 30 is a second sliding element 1602. The floating plate 15 connected to the first sliding element 1601 is a first floating plate 1501, and the floating plate 15 connected to the second sliding element 1602 is a second floating plate 1502. The sliding slot disposed on the first frame 20 is a first sliding slot (not shown in the figures), and the sliding slot disposed on the second frame 30 is a second sliding slot 301. Preferably, a number of the first sliding element 1601 is same as a number of the second sliding element 1602. In the embodiment, a number of sliding elements 16 in each group of the sliding element 16 is two, that is, the display device 100 includes two first sliding elements 1601 and two second sliding elements 1602. The two first sliding elements 1601 are spaced from each other, and the two second sliding elements 1602 are spaced from each other. Preferably, the two first sliding elements 1601 are evenly distributed on the first floating plate 1501 along the first direction to improve stability of rotation of the first floating plate 1501. The two second sliding elements 1602 are evenly distributed on the first floating plate 1501 along the first direction to improve stability of rotation of the second floating plate 1502.

Referring to FIG. 13 to FIG. 16. In some embodiments, the first support plate 50 is a flat plate structure. In the flattened state, the first support plate 50 is flush with the cover plate 14, so as to jointly support the flexible display screen 10. In the folded state, the first support plate 50 is disposed vertically to the cover plate 14, so as to support non-bending parts of the flexible display screen 10. The first support plate 50 is slidably connected to the second frame 30 through at least one slide block 80. The slide block 80 is fixed on a side of the first support plate 50 towards the second frame 30. The second frame 30 is correspondingly provided with at least one slide slot 302, and the slide block 80 is slidably accommodated in the slide slot 302. Specifically, in the embodiment, both a number of the slide blocks 80 and a number of the slide slots 302 are two. The two slide blocks 80 are fixed on the first support plate 50 by screws 90, and the two slide slots 302 are evenly distributed on the second frame 30 along the first direction, so as to improve stability of sliding of the first support plate 50.

In some embodiments, two opposite sides of the first support plate 50 are also respectively provided with a lug 501. The second frame 30 is correspondingly provided with two clamping slots 303. A lug 501 is correspondingly accommodated in the clamping slot 303, and the lug 501 can reciprocate in the corresponding clamping slot 303 along the second direction.

Preferably, a force source of the first preload force in the first preload mechanism 60 is an elastic object, and the first preload force is an elastic force. This design can make the first preload force exerted by the first preload mechanism 60 on the first support plate 50 have floatability when the display device switches between the folded state and the flattened state, and the floatability can enable the first preload force to make corresponding "self-adjustment" according to position relationships between relevant structures (such as the first support plate 50 and the hinge transmission mechanism 40) and the force source, so as to avoid collision or pulling on relevant structures, thus prolonging service life of the device. It can be understood that the force source of the first preload force in the first preload mechanism 60 can also be not limited to the elastic object. Selection of the force source can be adjusted according to actual situations. When the display device switches between the folded state and the flattened state, the force source can also be an ordinary elastic object or a conventional transmission element, providing that positions of relevant structures do not interfere with the force source, as long as the force source can meet requirement of exerting two fixed forces on the first support plate 50 under two different states. In some preferred embodiments, the first preload mechanism 60 includes at least one spring assembly, and each spring assembly includes a spring 61 and a push pin 62. The push pin 62 is installed on the first support plate 50, and the spring 61 is sleeved on the push pin 62 and accommodated in the second frame 30 in a compressed state. That is, in some preferred embodiments, the force source of the first preload force in the first preload mechanism 60 is the spring 61, and the first preload force is an elastic force generated by elastic deformation of the spring 61. It can be understood that the force source of the first preload force in the first preload mechanism 60 can also be other elastic objects in other preferred embodiments, such as a coil spring.

Specifically, in the embodiment, the first support plate 50 is provided with a guiding slot 502, and the push pin 62 drills through the guiding slot 502. Preferably, a length of the guiding slot 502 is slightly greater than a diameter of the push pin 62, so that the push pin 62 can reciprocate slightly in the guiding slot 502 along the second direction, so as to improve floatability of the first support plate 50.

Specifically, in the embodiment, the second frame 30 is provided with at least one accommodating slot 304, and the spring 61 is correspondingly accommodated in the accommodating slot 304 in a compressed state. Specifically, an end of the spring 61 is abutted against the push pin 62, and another end of the spring 61 is abutted against an inner end surface of the accommodating slot 304 close to an end of the base 13, so that a direction of the first preload force exerted by the spring 61 on the first support plate 50 is the second direction. It can be understood that because the first frame 20 and the second frame 30 are not directly rotationally connected, but are rotationally connected to the hinge transmission mechanism 40, respectively, so as to realize a rotational connection between the two. Therefore, in the folded state, a folded shape similar to "water-drop" at a bending part of the flexible display screen 10 corresponding to the hinge transmission mechanism 40 used to connect the first frame 20 and the second frame 30 will be undoubtedly formed. The design of the folded shape "water-drop" makes a linear distance from an end part of the flexible display screen 10 to a bending center (along the second direction) of the flexible display screen 10 in the folded state less than a linear distance from the end part of the flexible display screen 10 to the bending center (along the second direction) of the flexible display screen 10 in the flattened state. Therefore, during a switching process of the display device 100 between the folded state and the flattened state, values of the first preload force can change with changes of states. Specifically, a value of the first preload force in the flattened state reaches a maximum, and a value of the first preload force in the folded state reaches a minimum.

Preferably, the first preload mechanism 60 includes two spring assemblies, and the two spring assemblies are symmetrically disposed at edges of the first support plate 50 close to two opposite sides of the first support plate 50, so as to improve balance of the first support plate 50 under the first preload force.

Preferably, when the display device 100 is in the flattened state, a side of the first support plate 50 close to the base 13 is abutted against the floating plate 15. When the display device 100 is operable in the folded state, the side of the first support plate 50 close to the base 13 is separated from the floating plate 15. In this way, the preload force of the first support plate 50 can be further increased in the flattened state, so as to increase tension of the flexible display screen 10. It can be understood that the side of the first support plate 50 close to the base 13 can also always be abutted against the floating plate 15 during a switching process of the display device 100 between the folded state and the flattened state in some embodiments. In some embodiments, the side of the first support plate 50 close to the base 13 can always be separated from the floating plate 15 during the switching process of the display device 100 between the folded state and the flattened state.

Specifically, the display device 100 in the embodiment is a preferred structure. In the embodiment, when the display device 100 switches between the folded state and the flattened state, motion and connection relationships of each structure are described as following.

When the display device 100 is in the flattened state, the first frame 20 can be abutted against the second frame 30, the hinge transmission mechanism 40 can be accommodated in the first frame 20 and the second frame 30, and the flexible display screen 10 is supported on the first support plate 50, the floating plate 15, and the cover plate 14 in a plane state.

At this time, the spring 61 has a maximum compression and the first preload force is at a maximum value.

When the device 100 switches from the flattened state to the folded state, the first frame 20 and the second frame 30 rotate relative to the base 13 and move in opposite directions under an action of an external force until the first frame 20 and the second frame 30 shut and are close to each other in a parallel state, in this process:

the first frame 20 and the second frame 30 respectively drive the two transmission gears 122 to rotate, the two transmission gears 122 respectively drive the two linkage gears 123 to rotate, and the two linkage gears 123 are meshed with each other to achieve synchronization and stability of rotation of the first frame 20 and the second frame 30; and the first frame 20 and the second frame 30 respectively drive two ends of the flexible display screen 10 to move in opposite directions, and the two floating plates 15 respectively rotate relative to the cover plate 14; at a same time, the first sliding element 1601 moves relative to the first frame 20 along a direction opposite to the second direction, the second sliding element 1602 moves relative to the second frame 30 along the second direction, and the two floating plates 15 drive a middle part of the flexible display screen 10 to gradually bend into a "water-drop"; at this time, when the two floating plates 15 and the cover plate 14 define a triangular space, the bending part "water-drop" of the flexible display screen 10 is accommodated in the triangular space; as the middle part of the flexible display screen 10 is gradually bent, the linear distance from the end part of the flexible display screen 10 to a center position (along the second direction) gradually decreases, a compression amount of the spring 61 gradually decreases, the spring 61 drives the first support plate 50 to gradually move relative to the first frame 20 along the second direction, and the first preload force gradually decreases and reaches a minimum when a folding is completed.

When the display device 100 is fully operable in the folded state, the first frame 20 and the second frame 30 shut and are close to each other in a parallel state. The two floating plates 15 and the cover plate 14 define a triangular space, the bending part "water-drop" of the flexible display screen 10 is accommodated in the triangular space, the compression amount of the spring 61 is at a minimum, and the first preload force is at a minimum.

Motion of each structure when the device 100 switching from the folded state to the flattened state is opposite to motion of each structure when the device 100 switching from the flattened state to the folded state, which is not repeated here.

The display device and the folding display module thereof provided by the embodiments of the present disclosure are described in detail. In this paper, specific embodiments are adopted to illustrate a principle and implementation modes of the present disclosure. The description of the above-mentioned embodiments is only used to help understand methods and a core idea of the present disclosure. At the same time, for those skilled in the art, according to the idea of the present disclosure, there will be changes in specific implementation modes and a scope of the present disclosure. In conclusion, contents of the specification should not be interpreted as a limitation of the present disclosure.

What is claimed is:

1. A display device, comprising:
   a first frame;
   a second frame butted with the first frame;
   a hinge transmission mechanism disposed at a butt joint of the first frame and the second frame, and rotationally connected to the first frame and the second frame respectively, wherein a rotation shaft of the first frame and the second frame when rotating relative to the hinge transmission mechanism extends along a first direction;
   a first support plate slidably connected to the second frame, wherein the first support plate is capable to reciprocate relative to the second frame along a second direction, the second direction points from an end of the first support plate close to the hinge transmission mechanism to an end of the first support plate away from the hinge transmission mechanism, and the second direction is perpendicular to the first direction;
   a flexible display screen, wherein an end of the flexible display screen is fixed on the first frame, and another end of the flexible display screen is fixedly attached on a side of the first support plate away from the second frame; and
   a first preload mechanism disposed on the second frame, wherein the first preload mechanism is configured to exert a first preload force on the first support plate, and a direction of the first preload force is same as the second direction;
   wherein the hinge transmission mechanism comprises:
      a transmission assembly, disposed at the butt joint of the first frame and the second frame and rotatably connected to the first frame and the second frame; and
      a hinge assembly, hinged with the transmission assembly; and wherein the transmission assembly comprises:
      a base disposed at the butt joint of the first frame and the second frame, wherein the hinge assembly is hinged with the base;
      two gear transmission units accommodated in the base and respectively disposed at a position close to two ends of the base; wherein each of the two gear transmission units comprises a mounting base, two transmission gears, and two linkage gears, the mounting base is fixed in the base, rotation shafts of the two transmission gears and rotation shafts of the two linkage gears are rotatably disposed in the mounting base, the two linkage gears are meshed with each other and configured to rotate in opposite directions, and each of the two linkage gears is meshed with a corresponding one of the two transmission gears, and configured to rotate together with the corresponding one of the two transmission gears in a same direction; and
      two connecting units respectively disposed at two opposite ends of the base; wherein each of the two connecting units comprises a first connecting element and a second connecting element, the first connecting element and the second connecting element are respectively connected to the rotation shafts of the two transmission gears, the first connecting element is fixedly connected to the first frame, and the second connecting element is fixedly connected to the second frame.

2. The display device according to claim 1, wherein a force source of the first preload force is an elastic object, and the first preload force is an elastic force.

3. The display device according to claim 2, wherein the first preload mechanism comprises at least one spring assembly, the at least one spring assembly comprises a spring and a push pin, the push pin is installed on the first support plate, the spring is sleeved on the push pin and accommodated in the second frame in a compressed state, and the spring is configured to exert the first preload force on the first support plate.

4. The display device according to claim 3, wherein the first support plate is provided with at least one guiding slot, and the push pin drills through the at least one guiding slot.

5. The display device according to claim 4, wherein a length of the at least one guiding slot is greater than a diameter of the push pin, and the push pin is capable to reciprocate in the at least one guiding slot along the second direction.

6. The display device according to claim 3, wherein the second frame is provided with at least one accommodating slot, the spring is correspondingly accommodated in the at least one accommodating slot in a compressed state, an end of the spring is abutted against the push pin, and another end of the spring is abutted against an inner end surface of the at least one accommodating slot close to an end of the hinge transmission mechanism.

7. The display device according to claim 3, wherein the first preload mechanism comprises two spring assemblies, and the two spring assemblies are symmetrically disposed at edges of the first support plate close to two opposite sides of the first support plate.

8. The display device according to claim 3, wherein the display device is operable in a folded state and a flattened state, and a value of the first preload force in the flattened state is greater than a value of the first preload force in the folded state.

9. The display device according to claim 1, further comprising at least one slide block, wherein the at least one slide block is fixed on a side of the first support plate towards the second frame; the second frame is provided with at least one chute, the at least one slide block is slidably accommodated in the at least one chute, and a cooperation of the at least one slide block and the at least one chute realizes a sliding connection between the second frame and the first support plate.

10. The display device according to claim 9, further comprising two slide blocks, wherein each of the two slide blocks is fixed on a side of the first support plate towards the second frame provided with two chutes evenly distributed along the first direction; each of the two slide blocks is slidably accommodated in a corresponding one of the two chutes.

11. The display device according to claim 1, wherein two opposite sides of the first support plate are respectively provided with a lug, the second frame is provided with two clamping slots, two lugs are correspondingly accommodated in the two clamping slots, and each of the two lugs is capable to reciprocate in a corresponding one of the two clamping slots along the second direction.

12. The display device according to claim 1, wherein the mounting base comprises a first part and a second part, the first part and the second part are detachably fixed in the base, the first part is provided with four first mounting holes, and the second part is provided with four second mounting holes corresponding to the four first mounting holes; two ends of the rotation shafts of the two transmission gears and two ends of the rotation shafts of the two linkage gears are correspondingly installed in the four first mounting holes and the four second mounting holes, respectively, so as to accommodate gear parts of the two transmission gears and gear parts of the two linkage gears between the first part and the second part.

13. The display device according to claim 1, wherein the transmission assembly further comprises a cover plate fixed on a side of the base facing the flexible display screen and covering the two gear transmission units.

14. The display device according to claim 13, wherein the display device is operable in a folded state and a flattened state, the cover plate is perpendicular to the first support plate in the folded state and flush with the first support plate in the flattened state.

15. The display device according to claim 1, wherein the hinge assembly comprises two floating plates, at least one first sliding element, and at least one second sliding element, and the two floating plates are hinged with two opposite sides of the transmission assembly, respectively; the first sliding element and the second sliding element are respectively hinged with a corresponding one of the two floating plates, the first sliding element is slidably disposed on the first frame, and the second sliding element is slidably disposed on the second frame.

16. The display device according to claim 15, wherein each of the two floating plates comprises a body part and a first hinge part disposed on two sides of the body part, the body part is a flat plate, and the hinge part is hinged with the transmission assembly and the first sliding element or the second sliding element.

17. A display device, comprising:
a first frame;
a second frame butted with the first frame;
a hinge transmission mechanism disposed at a butt joint of the first frame and the second frame, and rotationally connected to the first frame and the second frame, respectively, wherein a rotation shaft of the first frame and the second frame when rotating relative to the hinge transmission mechanism extends along a first direction;
a first support plate slidably connected to the second frame, wherein the first support plate is capable to reciprocate relative to the second frame along a second direction, the second direction points from an end of the first support plate close to the hinge transmission mechanism to an end of the first support plate away from the hinge transmission mechanism, and the second direction is perpendicular to the first direction;
a second support plate slidably connected to the first frame, wherein the second support plate is capable to reciprocate relative to the first frame along the second direction; a flexible display screen, wherein an end of the flexible display screen is fixed on the second support plate away from the second frame, and another end of the flexible display screen is fixedly attached on a side of the first support plate away from the second frame;
a first preload mechanism disposed on the second frame, wherein the first preload mechanism is configured to exert a first preload force on the first support plate, and a direction of the first preload force is same as the second direction; and
a second preload mechanism disposed on the first frame, wherein the second preload mechanism is configured to exert a second preload force on the second support plate, and a direction of the second preload force is opposite to the second direction;
wherein the hinge transmission mechanism comprises:

a transmission assembly, disposed at the butt joint of the first frame and the second frame and rotatably connected to the first frame and the second frame; and a hinge assembly, hinged with the transmission assembly; and wherein the transmission assembly comprises:

a base disposed at the butt joint of the first frame and the second frame, wherein the hinge assembly is hinged with the base;

two gear transmission units accommodated in the base and respectively disposed at a position close to two ends of the base; wherein each of the two gear transmission units comprises a mounting base, two transmission gears, and two linkage gears, the mounting base is fixed in the base, rotation shafts of the two transmission gears and rotation shafts of the two linkage gears are rotatably disposed in the mounting base, the two linkage gears are meshed with each other and configured to rotate in opposite directions, and each of the two linkage gears is meshed with a corresponding one of the two transmission gears, and configured to rotate together with the corresponding one of the two transmission gears in a same direction; and two connecting units respectively disposed at two opposite ends of the base; wherein each of the two connecting units comprises a first connecting element and a second connecting element, the first connecting element and the second connecting element are respectively connected to the rotation shafts of the two transmission gears, the first connecting element is fixedly connected to the first frame, and the second connecting element is fixedly connected to the second frame.

* * * * *